United States Patent
Güntherberg et al.

(10) Patent No.: US 6,835,776 B2
(45) Date of Patent: Dec. 28, 2004

(54) STABILIZED THERMOPLASTIC MOLDING MATERIALS

(75) Inventors: Norbert Güntherberg, Speyer (DE); Bernhard Czauderna, Hirschberg (DE); Peter Ittemann, Lampertheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 52 days.

(21) Appl. No.: 10/296,452

(22) PCT Filed: May 17, 2001

(86) PCT No.: PCT/EP01/05611

§ 371 (c)(1),
(2), (4) Date: Nov. 25, 2002

(87) PCT Pub. No.: WO01/92391

PCT Pub. Date: Dec. 6, 2001

(65) Prior Publication Data

US 2003/0158335 A1 Aug. 21, 2003

(30) Foreign Application Priority Data

May 31, 2000 (DE) .......................................... 100 26 858

(51) Int. Cl.[7] .......................... C08L 25/12; C08L 51/04; C08L 55/02

(52) U.S. Cl. .......................... 525/69; 525/71; 525/149; 525/227; 525/193; 525/290; 525/316; 525/327.3; 525/187; 524/504

(58) Field of Search .......................... 525/69, 71, 149, 525/227, 193, 290, 316, 327.3, 187; 524/504

(56) References Cited

U.S. PATENT DOCUMENTS

| | | |
|---|---|---|
| 2,891,027 A | 6/1959 | Coler et al. |
| 3,051,663 A | 8/1962 | Coler et al. |
| 3,532,660 A | 10/1970 | Ott et al. |
| 3,637,555 A | 1/1972 | Marinacci et al. |
| 3,640,929 A | 2/1972 | Darling et al. |
| 5,298,540 A | 3/1994 | Pauquet et al. |
| 5,346,959 A | 9/1994 | Goman et al. |
| 5,852,124 A * | 12/1998 | Wang et al. ............... 525/316 |
| 6,596,811 B1 * | 7/2003 | Barghoorn et al. ........... 525/63 |

FOREIGN PATENT DOCUMENTS

| | | |
|---|---|---|
| CA | 2143168 | 8/1995 |
| DE | 1 802 552 | 5/1969 |
| DE | 1 694 101 | 3/1971 |
| DE | 197 50747 | 5/1999 |
| EP | 135 801 | 4/1985 |
| EP | 184 788 | 6/1986 |
| EP | 536 483 | 4/1993 |
| EP | 712 894 | 5/1996 |
| GB | 1 369 589 | 10/1974 |
| WO | 94/07951 | 4/1994 |
| WO | 95/02639 | 1/1995 |
| WO | 01/23498 | 4/2001 |

* cited by examiner

Primary Examiner—James J. Seidleck
Assistant Examiner—Olga Asinovsky
(74) Attorney, Agent, or Firm—Keil & Weinkauf

(57) ABSTRACT

Thermoplastic molding materials containing the following ingredients with regard to components A–F: A) 5–70 wt. % of at least one graft copolymer A) consisting of a rubber elastic base with a glass transition temperature below 0° and a grafted overlay made of a styrene compound and acrylonitrile or methacrylonitrile or mixture thereof in addition to, optionally, other monoethylenically unsaturated monomers, B) 29–90 wt. % of a hard copolymer made of at least one styrene compound, acrylonitrile or methacrylonitrile or mixtures thereof and, optionally, other monoethylenically unsaturated monomers, C) 0–5 wt. % of at least one three-block copolymer X-Y-X with a middle block Y propylenoxide units and terminal block X made of ethyleneoxide units, D) 0.01–5 wt. % of at least one butylated reaction product of cresol with dicyclopentadiene, E) 0.01–5 wt. % of at least one thiocarboxylic acid ester, F) 0.01–5 wt. % of at least one alkaline metal salt or alkaline earth metal salt of a $C_6$–$C_{20}$carboxylic acid, G) 0–30 wt. % in relation to constituents A)–G), of other usual additives. The moulding materials exhibit a db* -value, after exposure to the atmosphere, of less than +5,0 after 100 hours of exposure to light and the atmosphere according to ISO 4892/2, method A, black temperature 65° C. colour measurement according to CIE-Lab in accordance with DIN 6174 and DIN 5033.

10 Claims, No Drawings

STABILIZED THERMOPLASTIC MOLDING MATERIALS

The invention relates to thermoplastic molding compositions comprising, based on components A) to F), A) from 5 to 70% by weight of at least one graft copolymer A) made from, based on A),
  a1) from 10 to 90% by weight of at least one elastomeric graft base with a glass transition temperature below 0° C., and
  b2) from 10 to 90% by weight of at least one graft made from, based on a2),
    a21) from 50 to 100% by weight of at least one styrene compound,
    a22) from 0 to 50% by weight of acrylonitrile or methacrylonitrile, or a mixture of these, and
    a23) from 0 to 50% by weight of at least one other monoethylenically unsaturated monomer,
B) from 29 to 90% by weight of a hard copolymer made from, based on B),
  b1) from 50 to 100% by weight of at least one styrene compound,
  b2) from 0 to 50% by weight of acrylonitrile or methacrylonitrile, or a mixture of these, and
  b3) from 0 to 50% by weight of at least one other monoethylenically unsaturated monomer,
C) from 0 to 5% by weight of at least one three-block copolymer X-Y-X having a central block Y made from propylene oxide units and having terminal blocks X made from ethylene oxide units,
D) from 0.01 to 5% by weight of at least one butylated reaction product of p-cresol with dicyclopentadiene of the formula (I)

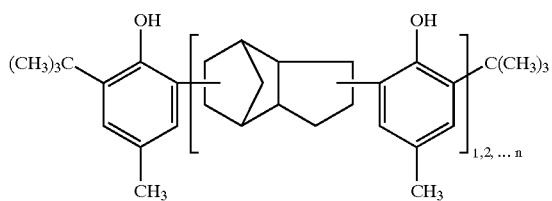

where $n \leq 10$,

E) from 0.01 to 5% by weight of at least one thiocarboxylic ester,
F) from 0.01 to 5% by weight of at least one alkali metal salt, or alkaline earth metal salt, of a $C_6$–$C_{20}$ carboxylic acid, and
G) from 0 to 30% by weight, based on components A) to G), of other conventional additives, where the weathered db* value of the molding compositions is below +5.0 after 100 hours of exposure to light and weathering to ISO 4892/2, method A, black-panel temperature 65° C., using the CIE-Lab color system, to DIN 6174 and DIN 5033.

The invention also relates to processes for preparing the molding compositions, and to the use of the molding compositions for preparing moldings, fibers and films, and also to the moldings, fibers and films.

Impact-modified styrene-acrylonitrile polymers, such as ABS (polybutadiene rubber particles grafted with polystyrene-acrylonitrile, in a polystyrene-acrylonitrile matrix) or ASA (polyalkyl acrylate rubber, structure otherwise as ABS) are used in a wide variety of applications. They are preferably used to produce moldings intended to have good mechanical properties. It is often necessary to use additives to give the molding compositions certain properties, such as antistatic properties, and in particular good weathering resistance, etc.

French Patent 1 239 902 discloses thermoplastic molding compositions comprising an antistatic, EO-PO-EO three-block copolymers (EO is ethylene oxide, and PO is propylene oxide).

EP-A 135 801 describes blends made from polycarbonate, from ABS or ASA and from an EO-PO-EO three-block copolymer, with certain molar masses for individual blocks.

EP-A 536 483 discloses ABS molding compositions which comprise a PO polymer whose ends have been capped with EO and which contains 1,4-butylene terephthalate units.

U.S. Pat. No. 5,346,959 describes blends made from ABS, from styrene-maleic anhydride copolymer, and from OH-functionalized PO-EO-PO block copolymers (i.e. an EO central block).

DE-OS 16 940 101 describes ABS molding compositions stabilized with a phenolic stabilizer, with dilauryl thiodipropionate, and with $C_1$–$C_{20}$ fatty esters (butyl stearate).

British Patent 1 369 589 discloses styrene-butadiene-acrylonitrile copolymers which comprise phenolic stabilizers and dilauryl thiodipropionate, besides asbestos fibers.

EP-A 184 788 discloses flame-retardant ABS molding compositions which comprise stearically hindered phenols and costabilizers.

WO-A 95/02639 describes the stabilization of recycled styrene-containing plastic from waste and collection of useful materials. The stabilizers used comprise stearically hindered phenols, metal oxides/metal hydroxides/metal carbonates, esters of thiodipropionic acid, and, if desired, metal salts of fatty acids.

WO-A 94/07951 discloses the stabilization of plastics from waste, using a mixture made from a stearically hindered phenol, from an organic phosphite or phosphonite, and from metal oxides/metal hydroxides/metal carbonates.

EP-A 506 614 describes the stabilization of recycled thermoplastics using stearically hindered phenols and phosphoric esters.

EP-A 669 367 describes ABS molding compositions stabilized with a trialkyl phenol, with a stearically hindered phenol, and, if desired, with dilauryl or distearyl thiodipropionate.

EP-A 712 894 discloses ABS molding compositions, mentioning, inter alia, stearically hindered phenols as stabilizers.

DE-A 197 50 747 describes stabilizers for styrene co- and terpolymers, such as ABS, composed of a stearically hindered phenol, of dilauryl and/or distearyl thiodipropionate, and of a phosphite.

None of the documents discloses impact-modified styrene-acrylonitrile molding compositions which comprise all three of the additives D), E) and F), as described above, together, and where the weathered db* value of the molding compositions is below +5.0 after 100 hours of exposure to light and weathering to ISO 4892/2, method A, black-panel temperature 65° C., using the CIE-Lab color system, to DIN 6174 and DIN 5033.

A feature common to all of the prior art molding compositions is that their stabilization with respect to weathering (rain, UV light) and heat-aging is unsatisfactory or is achieved only by sacrificing other advantageous properties, in particular by sacrificing their good mechanical properties, such as toughness.

It is an object of the present invention to remove these disadvantages, and in particular to provide uncolored molding compositions which in particular when uncolored (i.e. without any addition of colorants which hide the intrinsic color of the molding compositions) have better weathering resistance and heat-aging resistance than the prior art molding compositions and which at the same time have a balanced mechanical property profile, in particular high toughness even after weathering and heat-aging. In addition, the molding compositions should have good flowability, and also good antistatic properties. Compared with prior art molding compositions, the molding compositions should show less color change on weathering.

The molding compositions should also ensure that moldings produced from them have reduced tendency to form dust patterns when the moldings are stored in a dusty atmosphere. In addition, the molding compositions should have improved colorant dispersion, that is to say that colorants, such as pigments, should be capable of particularly uniform dispersion in the molding compositions. Finally, the molding compositions should have better demoldability when injection-molded.

We have found that this object is achieved by means of the thermoplastic molding compositions defined at the outset, and also by processes for their preparation, by their use, and by the resultant moldings, fibers or films.

In the molding compositions of the invention, based in each case on components A) to F), the proportion of component A) is from 5 to 70% by weight, preferably from 8 to 65% by weight, and particularly preferably from 10 to 60% by weight, the proportion of component B) is from 29 to 90% by weight, preferably from 34 to 88% by weight, and particularly preferably from 39 to 85% by weight, the proportion of component C) is from 0 to 5% by weight, preferably from 0.01 to 5% by weight, and particularly preferably from 0.01 to 4% by weight, in particular from 0.01 to 3% by weight, the proportion of component D) is from 0.01 to 5% by weight, preferably from 0.03 to 4% by weight, and particularly preferably from 0.05 to 3% by weight, the proportion of component E) is from 0.01 to 5% by weight, preferably from 0.03 to 4% by weight, and particularly preferably from 0.05 to 3% by weight, the proportion of component F) is from 0.01 to 5% by weight, preferably from 0.02 to 4% by weight, and particularly preferably from 0.1 to 3% by weight, and the proportion of component G), based on components A) to G), is from 0 to 30% by weight, preferably from 0 to 25% by weight, and particular preferably from 0 to 20% by weight.

The total of components A) to G) is, of course, 100% by weight.

Component A

Component A) is a graft copolymer having an elastomeric particulate graft base a1) with a glass transition temperature below 0° C., measured by differential scanning calorimetry (DSC), as described in DIN 53765. This graft base may be selected from all of the known suitable elastomeric polymers. These are preferably diene rubbers, acrylate rubbers, EPDM rubbers, siloxane rubbers or other rubbers.

Component a1) is preferably at least one (co)polymer made from a11) from 60 to 100% by weight, preferably from 70 to 100% by weight, of at least one conjugated diene or $C_1$–$C_{10}$ alkyl acrylate, or a mixture of these, a12) from 0 to 30% by weight, preferably from 0 to 25% by weight, of at least one other monoethylenically unsaturated monomer, and a13) from 0 to 10% by weight, preferably from 0 to 6% by weight, of at least one crosslinking monomer.

Particularly suitable monomers a11) are butadiene, isoprene, chloroprene or mixtures of these, and also the $C_{1-10}$ alkyl acrylates mentioned below, and mixtures of these. It is preferable to use butadiene or isoprene or a mixture of these, especially butadiene, or else n-butyl acrylate or 2-ethylhexyl acrylate, or a mixture of these, especially n-butyl acrylate. The use of butadiene is very particularly preferred.

Where appropriate, monomers which vary the mechanical and thermal properties of the graft base within a certain range may be present as component a12). Examples which may be mentioned of these monoethylenically unsaturated comonomers are styrene, substituted styrenes, acrylonitrile, methacrylonitrile, acrylic acid, methacrylic acid, dicarboxylic acids, such as maleic acid and fumaric acid, and also anhydrides of these, such as maleic anhydride, nitrogen-functional monomers, such as dimethylaminoethyl acrylate, diethylaminoethyl acrylate, vinylimidazol, vinylpyrrolidone, vinylcaprolactam, vinylcarbazol, vinylaniline, acrylamide, $C_{1-10}$-alkyl esters of acrylic acid, such as methyl acrylate, ethyl acrylate, n-propyl acrylate, isopropyl acrylate, n-butyl acrylate, isobutyl acrylate, sec-butyl acrylate, tert-butyl acrylate, ethylhexyl acrylate, the corresponding $C_{1-10}$ alkyl esters of methacrylic acid, and also hydroxyethyl acrylate, aromatic and araliphatic esters of acrylic acid or methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate, and 2-phenoxyethyl methacrylate, N-substituted maleimides, such as N-methyl-, N-phenyl-, and N-cyclohexylmaleimide, unsaturated ethers, such as vinyl methyl ether, and also mixtures of these.

Preferred components a12) are styrene, α-methylstyrene, n-butyl acrylate, methyl methacrylate (MMA) and mixtures of these, in particular styrene and n-butyl acrylate or a mixture of these, and especially styrene. If a component a12) is used, but no component a13), the proportion of component a11) is preferably from 70 to 99.9% by weight, particularly preferably from 90 to 99% by weight, and the proportion of component a12) is from 0.1 to 30% by weight, particularly preferably from 1 to 10% by weight. Particular preference is given to butadiene-styrene copolymers and n-butyl acrylate-styrene copolymers within the stated range of amounts.

Examples of crosslinking monomers of component a13) are divinyl compounds, such as divinylbenzene, diallyl compounds, such as diallyl maleate, allyl esters of acrylic or methacrylic acid, dihydrodicyclopentadienyl acrylate (DCPA), divinyl esters of dicarboxylic acids, such as succinic acid or adipic acid, and diallyl or divinyl ethers of dihydric alcohols, for example of ethylene glycol or of 1,4-butanediol.

The graft a2) is obtained from, based on a2), a21) from 50 to 100% by weight, preferably from 55 to 90% by weight, and particularly preferably from 60 to 85% by weight, of at least one styrene compound, a22) from 0 to 50% by weight, preferably from 10 to 45% by weight, and particularly preferably from 15 to 40% by weight, of acrylonitrile or methacrylonitrile, or a mixture of these, and a23) from 0 to 50% by weight, preferably from 0 to 30% by weight, and particularly preferably from 0 to 10% by weight, of at least one other monoethylenically unsaturated monomer.

The graft a2) contains at least one styrene compound a21). Preference is given to styrene, α-methyl styrene, or other substituted styrenes, and these styrenes may have one or more $C_1$–$C_8$-alkyl substituents on the aromatic system. It is particularly preferable to use styrene or α-methyl styrene, or a mixture of these, very particularly preferably styrene.

Other monoethylenically unsaturated monomers a23) which may be used are those mentioned above as monomers a12), preferably methyl methacrylate (MMA) and n-butyl acrylate, particularly preferably MMA.

The graft a2) is preferably a styrene-acrylonitrile copolymer, in particular having an acrylonitrile content of from 15 to 40% by weight. In one particular, likewise preferred, embodiment the graft a2) contains from 16 to 30% by weight, preferably from 17 to 28% by weight, in particular from 18 to 25% by weight, of acrylonitrile.

The graft copolymers A) are usually prepared by emulsion polymerization. The polymerization here generally takes place at from 20 to 100° C., preferably at from 30 to 80° C. Conventional emulsifiers are often added here, for example alkali metal alkyl- or alkylaryl sulfonates, alkyl sulfates, fatty alcohol sulfonates, sulfosuccinates, ether sulfonates, resin soaps or salts of higher fatty acids having from 10 to 30 carbon atoms. It is preferable to use the alkali metal salts, in particular the sodium or potassium salts of alkyl sulfonates, or fatty acids having from 10 to 18 carbon atoms. The emulsifiers are generally used in amounts of from 0.2 to 5% by weight, in particular from 0.3 to 3% by weight, based on the monomers used in preparing the graft base.

In preparing the dispersion, it is preferable to use sufficient water to give the finished dispersion a solids content of from 20 to 55% by weight. A water/monomer ratio of from 2:1 to 0.7:1 is usually used.

Suitable free-radical generators for initiating the polymerization are those which decompose at the selected reaction temperature, i.e. both those which decompose by themselves and those which do so in the presence of a redox system. Examples of preferred polymerization initiators are free-radical generators such as peroxides, preferably peroxosulfates (such as sodium or potassium peroxosulfate) and azo compounds, such as azodiisobutyronitrile. It is also possible, however, to use redox systems, especially those based on hydroperoxides, such as cumene hydroperoxide. The polymerization initiators are generally used in amounts of from 0.1 to 1% by weight, based on the graft base monomers.

The free-radical generators and also the emulsifiers are added to the reaction mixture, for example batchwise as a total amount at the beginning of the reaction or in stages, divided into a number of portions, at the beginning and at one or more later times, or continuously over a defined period. Continuous addition may also follow a gradient, which may, for example, rise or fall and be linear or exponential or even a step function.

It is also possible to include in the reaction molecular weight regulators, such as ethylhexyl thioglycolate, n-dodecyl or t-dodecyl mercaptan or other mercaptans, terpinols and dimeric methylstyrene or other compounds suitable for regulating molecular weight. The molecular weight regulators may be added to the reaction mixture batchwise or continuously, as described above for the free-radical generators and emulsifiers.

To maintain a constant pH, preferably from 6 to 9, buffer substances may be added, for example sodium pyrophosphate, $Na_2HPO_4$/$NaH_2PO_4$, sodium hydrogen carbonate, or buffers based on citric acid/citrate. Molecular weight regulators and buffer substances are used in conventional amounts, and no further details need therefore be given in this connection.

It can also-be advantageous to use other electrolytes (in particular salts) to adjust the particle sizes and their distribution.

In one particular embodiment, it is also possible to prepare the graft base by polymerizing the monomers a1) in the presence of a finely divided latex (the seed latex method of polymerization). This latex is the initial charge and may be made from monomers which form elastomeric polymers or else from other monomers mentioned above. Suitable seed latices are made from, for example, polybutadiene or polystyrene.

In another preferred embodiment, the graft base a1) may be prepared by the feed method. In this process, the polymerization is initiated using a certain proportion of the monomers a1), and the remainder of the monomers a1) (the feed portion) is added as feed during the polymerization. The feed parameters (gradient shape, amount, duration, etc.) depend on the other polymerization conditions. The principles of the descriptions given in connection with the method of addition of the free-radical initiator and/or emulsifier are once again relevant here.

Graft polymers having a number of "soft" and "hard" shells are also suitable.

The precise polymerization conditions, in particular the type, amount and method of addition of the emulsifier and of the other polymerization auxiliaries are preferably selected so that the resultant latex of the graft polymer A) has a mean particle size, defined by the $d_{50}$ of the particle size distribution, of from 80 to 800 nm, preferably from 80 to 600 nm and particularly preferably from 85 to 400 nm.

In one embodiment of the invention, the reaction conditions are balanced in such a way as to give the polymer particles a bimodal or polymodal particle size distribution, i.e. a size distribution with at least two fairly pronounced maxima.

The bimodal particle size distribution is preferably achieved by (partial) agglomeration of the polymer particles. This can be achieved, for example, by the following procedure: the monomers, which form the core, are polymerized to a conversion of usually at least 90%, preferably greater than 95%, based on the monomers used. This conversion is generally achieved in from 4 to 20 hours. The resultant rubber latex has a mean particle size $d_{50}$ of not more than 200 nm and a narrow particle size distribution (virtually monodisperse system).

In the second step, the rubber latex is agglomerated. This is generally done by adding a dispersion of an acrylate polymer. Preference is given to the use of dispersions of copolymers of $C_1$–$C_4$-alkyl acrylates, preferably of ethyl acrylate, with from 0.1 to 10% by weight of monomers which form polar polymers, examples being acrylic acid, methacrylic acid, acrylamide, methacrylamide, N-methylol methacrylamide and N-vinylpyrrolidone. Particular preference is given to a copolymer from 90 to 96% of ethyl acrylate and from 4% to 10% of methacrylamide. The agglomerating dispersion may, if desired, also contain more than one of the acrylate polymers mentioned.

In general, the concentration of the acrylate polymers in the dispersion used for agglomeration should be from 3 to 40% by weight. For the agglomeration, from 0.2 to 20 parts by weight, preferably from 1 to 5 parts by weight, of the agglomerating dispersion are used for each 100 parts of the rubber latex, the calculation in each case being based on solids. The agglomeration is carried out by adding the agglomerating dispersion to the rubber. The addition usually takes from 1 to 30 minutes at from 20 to 90° C., preferably at from 30 to 75° C.

Besides an acrylate polymer dispersion, use may also be made of other agglomerating agents, such as acetic anhydride, for agglomerating the rubber latex. Agglomeration by pressure or freezing is also possible. The methods mentioned are known to the person skilled in the art.

Under the conditions mentioned, the rubber particles are only partially agglomerated, giving a bimodal distribution. More than 50%, preferably from 60 to 95%, of the particles (distribution by number) are generally in the non-agglomerated state after the agglomeration. The resultant partially agglomerated rubber latex is relatively stable, and it is therefore easy to store and transport it without coagulation occurring.

To achieve a bimodal particle size distribution of the graft polymer A), it is also possible to prepare, separately from one another in the usual manner, two different graft polymers A') and A") differing in their mean particle size, and to mix the graft polymers A') and A") in the desired mixing ratio.

The conditions for preparing the graft a2) may be the same as those used for preparing the graft base a1), and the graft a2) may be prepared in one or more process steps. In two-stage grafting, for example, it is possible to polymerize styrene and/or α-methylstyrene alone, and then styrene and acrylonitrile, in two sequential steps. This two-step grafting (firstly styrene, then styrene/acrylonitrile) is a preferred embodiment. Further details concerning the preparation of the graft polymers A) are given in DE-A 12 60 135 and 31 49 358 as well as EP-A 735 063.

It is advantageous in turn to carry out the graft polymerization onto the graft base a1) in aqueous emulsion. It may be undertaken in the same system used for polymerizing the graft base, and further emulsifier and initiator may be added. These need not be identical with the emulsifiers or initiators used for preparing the graft base a1). For example, it may be expedient to use a persulfate as initiator for preparing the graft base a1) but a redox initiator system for polymerizing the graft shell a2). Otherwise, that which was said for the preparation of the graft base a1) is applicable to the selection of emulsifier, initiator and polymerization auxiliaries. The monomer mixture to be grafted on may be added to the reaction mixture all at once, in portions in more than one step or, preferably, continuously during a particular period of the polymerization.

If ungrafted polymers made from the monomers a2) are produced with the graft base a1), these amounts, generally below 10% by weight of a2), are counted with the weight of component A).

Component B

Component B) is a hard copolymer made from, based on B), b1) from 50 to 100% by weight, preferably from 55 to 90% by weight, and particularly preferably from 60 to 85% by weight, of at least one styrene compound, 2) from 0 to 50% by weight, preferably from 10 to 45% by weight, and particularly preferably from 15 to 40% by weight, of acrylonitrile or methacrylonitrile, or a mixture of these, and b3) from 0 to 50% by weight, preferably from 0 to 30% by weight, and particularly preferably from 0 to 20% by weight, of at least one other monoethylenically unsaturated monomer.

Component B) preferably has a viscosity number VN (determined to DIN 53726 at 25° C., 0.5% by weight in dimethylformamide) of from 50 to 120 ml/g, particularly preferably from 52 to 110 ml/g, and in particular from 55 to 105 ml/g.

The styrene compound b1) used may be the monomers mentioned for a21), in particular styrene, α-methylstyrene or a mixture of these. In a mixture of this type the proportion of α-methylstyrene is preferably up to 50% by weight, based on b1). It is particularly preferable to use only styrene.

The other monoethylenically unsaturated monomers b3) used may be the abovementioned monomers for a12), in particular MMA, and also N-alkyl- and N-arylmaleimides e.g. N-phenylmaleimide.

B) is particularly preferably a styrene-acrylonitrile copolymer. It is particularly preferable to use a styrene-acrylonitrile copolymer having from 15 to 40% by weight, in particular from 20 to 33% by weight, of acrylonitrile as component b2). The copolymer particularly preferably contains from 22 to 31% by weight, especially from 23 to 29% by weight, of acrylonitrile.

Copolymers of this type are obtained in a known manner by bulk, solution, suspension, precipitation, or emulsion polymerization, preferably bulk or solution polymerization. Details of these processes are described, for example, in Kunststoffhandbuch, Ed. R. Vieweg and G. Daumiller, Vol. V "Polystyrol", Carl Hanser-Verlag Munich 1969, pp 118 et seq.

Preference is given to thermoplastic molding compositions in which component a11) is butadiene and component B) is a styrene-acrylonitrile copolymer having from 10 to 50% by weight, preferably from 22 to 33% by weight, and in particular from 23 to 29% by weight, of acrylonitrile.

Component C

Component C) is an EO-PO-EO three-block copolymer (EO is ethylene oxide, PO is propylene oxide). The average molecular weight $\overline{M}_n$ of the central PO block is preferably from 2000 to 4000, particularly preferably from 2200 to 3800, in particular from 2300 to 3500, very particularly preferably about 2300, about 2750, or about 3250, in each case ±10%. The average proportion of the terminal EO blocks taken together is preferably from 3 to 28% by weight, particularly preferably from 8 to 24% by weight, in particular from about 8 to 14% by weight or from 18 to 24% by weight, based on C).

The three-block copolymers used of the formula X-Y-X may be prepared in a manner known per se (N. Schönfeldt, Grenzflächenaktive Ethylenoxid-Addukte, Wissenschaftliche Verlagsgesellschaft mbH Stuttgart, 1976, pp. 53 et seq.) by polymerization in which a central polypropylene oxide block Y is first prepared and a block X made from ethylene oxide units is attached onto each of its two ends. The molecular weights given above are generally the average molecular weights (number-average $\overline{M}_n$, for example determined from the OH value to DIN 53240).

Preferred three-block copolymers and their preparation are also described in EP-A 125 801 and EP-A 018 591.

Component C) is commercially available, e.g. as Pluronic® (Fa. BASF)

Component D

Component D) is a butylated reaction product of cresol with dicyclopentadiene and has the formula (I)(n≦10, preferably≦6)

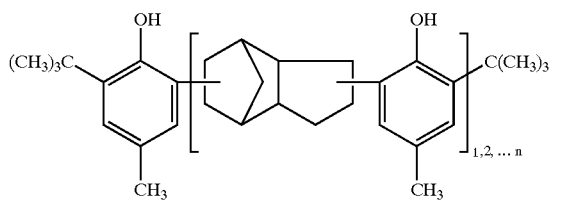

(I)

Use is preferably made of the isomer of the formula (II)

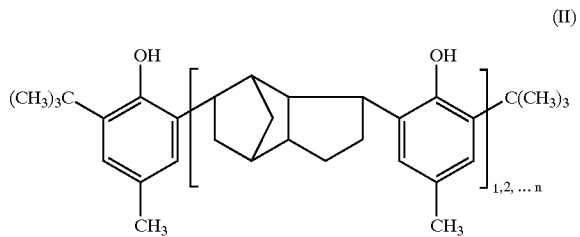

(II)

having an average molecular weight of from 600 to 700.

It is available commercially, for example as Santowhite®ML (Monsanto), Lowinox®22 CP46 or Lowinox®CPL (Lowi/Great Lakes), Wingsty®L (Goodyear) or Ralox®LC (Raschig).

Component E

Component E) is a thiocarboxylic ester. Preference is given to $C_6$–$C_{20}$ fatty esters of thiopropionic acid, particularly stearyl esters and lauryl esters. It is particularly preferable to use dilauryl thiodipropionate, distearyl thiodipropionate, or a mixture of these.

Dilauryl thiodipropionate is commercially available, e.g. as Cyanox®LTDP (American Cyanamid), Hostanox®SE1 or SE3 (Clariant); Irganox®PS 800 (Ciba-Geigy), Lowinox®DLTDP (Lowi) or Sumilizer®TPLR (Sumitomo). Distearyl thiodipropionate is commercially available, e.g. as Cyanox®STDP (American Cyanamid), Hostanox®SE2 or SE4 (Clariant), Irganox®PS 802 (Ciba-Geigy), Lowinox®DSTDP (Lowi) and Sumilizer®TPS (Sumitomo). The other suitable sulfur-containing carboxylic esters are also known and commercially available.

Component F

Component F) is an alkali metal salt or alkaline earth metal salt of a $C_6$–$C_{20}$ carboxylic acid. Preference is given to salts of sodium and of potassium, and also of magnesium, of calcium and of zinc. Preferred carboxylic esters are those of stearic acid, lauric acid, oleic acid, or palmitic acid. It is particularly preferable to use calcium stearate, zinc stearate, magnesium stearate, potassium stearate or sodium stearate, especially Mg stearate or K stearate.

These substances are known and are commercially available chemicals.

In the case of all of the additives C) to F) it is, of course, also possible to use mixtures of various additives C'), C") . . . to F'), F") . . . , these falling within the definition of the respective additive.

Component G

Component G), use may be made of various conventional auxiliaries and fillers other than components C) to F). Examples of substances of this type are lubricants, mold-release agents, waxes, pigments, dyes, flame retardants, antioxidants, stabilizers to protect from light, fibrous or pulverulent fillers, fibrous or pulverulent reinforcing agents, antistatics, and also other additives, and mixtures of these.

Examples of suitable lubricants and mold-release agents are stearic acids, stearyl alcohol, stearic esters, stearamides, and, also silicone oils, montan waxes, and those based on polyethylene or polypropylene.

Examples of pigments are titanium dioxide, phthalocyanine, ultramarine blue, iron oxides and carbon black, and the entire class of organic pigments.

For the purposes of the present invention, dyes are any of the dyes which can be used for the transparent, semitransparent or non-transparent coloring of polymers, in particular those dyes which are suitable for coloring-styrene copolymers. Dyes of this type are known to the skilled worker.

Examples of flame retardants which may be used are the halogen-containing or phosphorus-containing compounds known to the skilled worker, magnesium hydroxide, and also other commonly used compounds, and mixtures of these. Red phosphorus is also suitable.

Suitable antioxidants are in particular stearically hindered mononuclear or polynuclear phenolic antioxidants, which may have various substituents and also have bridging by substituents. These include both monomeric and oligomeric compounds, which may have been built up from two or more phenolic building blocks. It is also possible to use hydroquinones or hydroquinone analogs or substituted compounds, or else antioxidants based on tocopherols or on derivatives of these. It is also possible to use mixtures of various antioxidants. In principle, use may be made of any compounds which are commercially available or are suitable for styrene copolymers.

Together with the phenolic antioxidants mentioned above by way of example, concomitant use may be made of what are known as costabilizers, in particular phosphorus- or sulfur-containing costabilizers. Such P- or S-containing costabilizers are known to the skilled worker and available commercially.

Examples of suitable stabilizers to protect from light are various substituted resorcinols, salicylates, benzotriazoles, benzophenones, and HALS (hindered amine light stabilizers), for example those commercially available as Tinuvin®.

Examples of fibrous or pulverulent fillers are carbon fibers or glass fibers in the form of glass wovens, glass mats or glass silk rovings, chopped glass, glass beads, and also wollastonites, particularly preferably glass fibers. When glass fibers are used, these may have been provided with a size and with a coupling agent to improve compatibility with the components of the blend. The glass fibers incorporated may either be in the form of chopped glass fibers or else in the form of continuous strands (rovings).

Suitable particulate fillers are carbon black, amorphous silica, magnesium carbonate, chalk, powdered quartz, mica, bentonites, talc, feldspar or in particular calcium silicates, such as wollastonite or kaolin.

The amounts added to each of the additives are those which are usual, and it is therefore unnecessary to give any details in this connection.

Weathering Resistance

The thermoplastic molding compositions of the invention give a db* value of below +5.0 after 100 hours of exposure to light and weathering to ISO 4892/2, method A, black-panel temperature 65° C., using the CIE-Lab color system, to DIN 6174 and DIN 5033. This means high weathering resistance and good discoloration resistance. CIE stands for Commission Internationale de l'Eclairage. The db* is preferably below +3.0.

It is preferable that the thermoplastic molding compositions give a dG value below +10.0 after 100 hours of exposure to light and weathering to ISO 4892/2, method A, black-panel temperature 65° C., the color being subsequently measured to DIN 5033 at an observation angle of 10° in D65 daylight with evaluation to DIN 6167 (i.e. that the molding compositions have very high weathering resistance). The dG value is particularly preferably below +5.0, in particular below +2.5.

If the molding compositions comprise component C), it is particularly preferable that they give a db* value below +1.5 and a dG value below +2.5 after exposure to light and weathering as described above (i.e. have still better weathering resistance).

It will be understood that these data relate to the uncolored molding compositions (molding compositions not colored with colorants).

Color measurement by the CIE-Lab method is described in detail in DIN 6174 in combination with DIN 5033, Parts 1–9, for example. DIN 5033 defines the color measurement method and DIN 6174 defines the evaluation of the measurement by the CIE Lab method. These standards are incorporated herein by way of reference. The skilled worker will find further information in H. Völz, Industrielle Farbprüfung, Verlag VCH, Weinheim 1990, pp 171 et seq. and A. Berger-Schunn, Praktische Farbmessung, Verlag Muster-Schmidt, Göttingen 1991, pp. 93 et seq.

db* is the difference between two b* values. The two b* values are determined by the CIE-Lab method and subtracted from one another. db* is therefore the difference in the b* value from two measurements. The first b* value here is determined prior to exposure of the specimen to light and weathering for 100 hours, and the second db* value is determined thereafter.

The relationship is: db*=b* after weathering–b* prior to weathering. If the db* is positive (preceded by a positive sign) the implication is a shift in the perceived color in the yellow direction, i.e. toward a higher Yellowness Index of the specimen. If db* is negative (preceded by a negative sign), the implication is a shift in the perceived color in the blue direction.

dG is the change in the Yellowness Index, the Yellowness Index being defined as $$G = \frac{1.301 \cdot X - 1.149 \cdot Z}{Y} \cdot 100$$

where X, Y, and Z are the standard color values to DIN 5033. This formula applies to measurement to DIN 5033 using an observation angle of 10° with D65 daylight, and evaluation to DIN 6167. G is calculated from the above equation. dG is the difference between two G values. The first G value here is determined prior to exposure to light and weathering for 100 hours, and the second dG value is determined thereafter. The relationship is: dG=G after weathering–G prior to weathering.

Preparation of the Molding Compositions

The molding compositions are preferably prepared by separately preparing the individual components A), B), D), E) and F) and, where appropriate, C) and G), and mixing the components.

The graft polymer A) is preferably prepared by emulsion polymerization, as described above, giving an aqueous dispersion.

The resultant dispersion of the graft polymer A) may either be mixed directly with components B), D), E) and F), and, where appropriate, C) and G), or it may first be worked up. The latter procedure is one of the preferred embodiments.

The dispersion of the graft polymer A) is worked up in a manner known per se. The graft polymer A) is usually firstly precipitated from the dispersion, for example by adding salt solutions (such as calcium chloride, magnesium sulfate or alum) or acids (such as acetic acid, hydrochloric acid or sulfuric acid) which can bring about precipitation, or else by freezing (freeze coagulation). Precipitation using high shear forces, or shear precipitation, is also possible, the high shear forces being produced, for example, by rotor/stator systems or by forcing the dispersion through a narrow slit. The aqueous phase may be removed in a usual manner, for example by screening, filtering, decanting or centrifuging. This preliminary removal of the dispersion water usually gives graft polymers A) which are moist with water and have a residual water content of up to 60% by weight, based on A), where the residual water may, for example, either adhere externally to the graft polymer or else be enclosed within it.

After this, the graft polymer may, if required, be dried in a known manner, for example by hot air or using a pneumatic dryer. It is likewise possible to work up the dispersion by spray drying.

In one preferred embodiment, the graft polymers A) and the other components B) to G) are mixed in a mixing apparatus, producing a substantially molten polymer mixture.

"Substantially molten" means that the polymer mixture may contain, besides the predominant molten (softened) fraction, a certain proportion of solid constituents, for example unmelted fillers and reinforcing materials, such as glass fibers, metal flakes or even unmelted pigments, dyes, etc. "Molten" means that the polymer mixture flows at least to some extent, i.e. that it is softened at least to the extent of having plastic properties.

The mixing apparatuses used are those known to the skilled worker. It is possible, for example, to mix components A) to G) by extruding, kneading or roll-milling these together, components A) to G) having been isolated, if necessary, in advance from the solution obtained during the polymerization or from the aqueous dispersion.

If one or more components are incorporated in the form of an aqueous dispersion or of an aqueous or non-aqueous solution, the water or the solvent is removed from the mixing apparatus, preferably an extruder, via a devolatilizing unit.

Examples of mixing apparatuses for carrying out the novel process are discontinuously operating heated internal mixers with or without rams, continuously operating kneaders, such as continuous internal mixers, screw compounders having axially oscillating screws, Banbury mixers, and also extruders, roll mills, mixing rolls where the rolls are heated and calenders.

Preference is given to using an extruder as mixing apparatus. Single- or twin-screw extruders, for example, are particularly suitable for extruding the melt. A twin-screw extruder is preferred.

In some cases, the mechanical energy introduced by the mixing apparatus during the mixing process is sufficient to bring about melting of the mixture, and therefore it is not necessary to heat the mixing apparatus. Otherwise, the mixing apparatus is generally heated. The temperature depends on the chemical and physical properties of components A) to G), and is to be selected so that a substantially molten polymer mixture is produced. However, the temperature should not be excessive, otherwise thermal degradation of the polymer mixture may occur. However, it may also be that the mechanical energy introduced is sufficiently great to require cooling of the mixing apparatus. The mixing apparatus is generally operated at from 150 to 300° C., preferably from 180 to 300° C.

In one preferred embodiment, the graft polymer A) is mixed with the polymer B) and with the other components C) if present, D), E), and F), and also, where appropriate, G) in an extruder, the dispersion of the graft polymer A) being metered directly into the extruder without prior removal of the water of the dispersion. The water is usually removed over the length of the extruder via suitable venting systems. Examples of venting systems which may be used are vents provided with retaining screws (which prevent the emergence of the polymer mixture).

In another embodiment, likewise preferred, the graft polymer A) is mixed with the polymer B) and with the other components C) if present, D), E), and F), and also, where appropriate, G) in an extruder, the graft polymer A) having been isolated in advance from the water of the dispersion, e.g. by screening, filtration, decanting or centrifuging. This prior removal of the water of the dispersion gives moist graft polymers A) with a residual water content of up to 60% by weight, based on A), and the residual water here may, for example, either adhere to the outer surface of the graft polymer or else be enclosed within it. The residual water present may then be removed as described above as vapor via venting devices on the extruder.

In one particularly preferred embodiment, however, the residual water in the extruder is not removed solely as vapor. Instead, some of the residual water is removed mechanically in the extruder and leaves the extruder in the liquid phase. To this end, a pressure is built up in the extruder by baffles, and this pressure forces the water out of the polymer. It flows through dewatering apertures in the form of liquid water. The polymer B) and components C) if present, D), E), and F), and also, where appropriate, G) may also be fed to this same extruder so that the finished molding composition is extruded as product of the process.

Further details on this process can be found in WO-A 98/13412, for example, which is expressly incorporated herein by way of reference.

However, it is also possible to begin by dewatering the graft polymer A) as described immediately above, by removing the water under pressure in the extruder, and to mix the dewatered graft polymer with the other components B) to G) in a second extruder, or in another mixing apparatus.

If an extruder is used for removing the water under pressure, or as mixing apparatus, the different sections of the extruder may, as is generally known, be individually heated or cooled, so as to set an ideal temperature profile along the screw axis. The skilled worker is also familiar with the fact that the individual sections of the extruder can generally have different lengths.

The temperatures and lengths to be chosen for the individual sections in a particular case differ depending on the chemical and physical properties of components A) to G) and their mixing ratios. This also applies to the-screw rotation rate, which can vary over a wide range. Merely by way of example, extruder screw rotation rates in the range from 100 to 1200 rpm, preferably from 100 to 350 rpm may be mentioned.

In one preferred embodiment, the substantially molten polymer mixture prepared in the mixing apparatus from components A) to G) is subjected to rapid cooling.

The rapid cooling usually takes place by bringing the substantially molten polymer mixture (abbreviated to polymer melt below) into contact with a cold medium or with a cold surface.

The term "cold" here indicates a temperature sufficiently far below the temperature of the polymer melt to cool the polymer melt rapidly once contact has been established. The term "cold" therefore does not always mean cooled. For example, a polymer melt at 200° C. can be subjected to rapid cooling by water which has been preheated to 30–90° C., for example. The decisive factor is that the difference between the temperature of the polymer melt and that of the cold medium or of the cold surface is sufficient for rapid cooling of the melt.

The term "rapid" means that within a period of from 10 sec, preferably up to 5 sec, and particularly preferably up to 3 sec, the polymer melt is converted from the molten to the solid state and cooled.

It is preferable for the polymer melt to be rapidly cooled using a cold medium. These media may be gases or liquids.

Examples which may be mentioned of gaseous cold media (termed "cooling gas" below) are cooled or uncooled air or, in particular in the case of polymer melts susceptible to oxidation, gases such as carbon dioxide, nitrogen or noble gases. The cooling gas used is preferably air or nitrogen. The cooling gas is generally blown onto the polymer melt as it emerges from the mixing apparatus.

Liquid cold media (termed "cooling liquid" below) which may be used are organic or inorganic cooling liquids. Examples of suitable organic cooling liquids are oils and other high-boiling organic liquid substances which do not interact either chemically or physically (for example by swelling or salvation, etc.) with the polymer melt to be cooled, i.e. are chemically and physically inert toward the polymer melt.

It is preferable to use inorganic cooling liquids, in particular aqueous solutions or water. Particular preference is given to water, which during its use may be. cooled (freezing point to room temperature), uncooled, or temperature-controlled (room temperature to boiling point).

The cooling liquid is generally sprayed onto the polymer melt as it emerges. As an alternative, the polymer melt emerges from the mixing apparatus and passes directly into a bath of the cooling liquid. It is also possible for the cooling liquid to be in the form of a wide stream (flood) of liquid when it is supplied to the emerging polymer melt.

Spraying of the polymer melt with cooling liquid is particularly advantageous when using mixing apparatuses which produce films (for example roll mills, mixing rolls or calenders). The polymer melt emerging in the form of sheeting solidifies to give a film as a result of spraying with cooling liquid.

It is particularly preferable for the polymer melt to emerge from the mixing apparatus directly into a bath of the cooling liquid, and very particularly preferably into a water bath.

It is also possible, and in some cases preferable, for the polymer melt emerging from the mixing apparatus first to be subjected to only slight cooling by being brought into contact with a cooling gas, e.g. by blowing temperature-controlled air or an inert gas, such as gaseous nitrogen, onto the melt. This results in solidification of only the outer surface of the melt, while the interior of the polymer remains molten. The actual rapid cooling then takes place by bringing the melt, the surface of which has already solidified, into contact with a cooling liquid, e.g. water, whereupon the interior of the melt also hardens.

For example, the strands of polymer melt emerging from the dye head of the extruder can first be superficially solidified by blowing air onto the melt, and the strands can then be passed into a water bath where the actual rapid cooling takes place.

The polymer melt hardened by the rapid cooling can be further processed in a manner known to the skilled worker. The solidified polymer is generally comminuted by milling, chopping, pelletizing or other processes.

In a particularly preferred embodiment, the rapid cooling and the comminution are undertaken by the underwater granulation process. In underwater granulation, the polymer melt is discharged from the mixing apparatus via a die plate in which the holes (nozzles) are preferably round and preferably arranged in the shape of a circle. The die plate is located underwater (or immersed in another cooling liquid) or is sprayed with water (or another cooling liquid), and this may be done under an inert gas. Immediately behind the die plate on its outer side there are cutting apparatuses, preferably rotating knives, which separate the polymer as it is discharged. The polymer is therefore separated by rotating knives and rapidly cooled in water (or another cooling liquid), solidifying to give grains whose shapes are generally to some extent round and bead-like.

Arrangements of the holes having other than circular shape and shapes of the holes which are other than round are, however, commonly found in the die plate.

In another embodiment, a process termed underwater extrudate granulation is used. For this, the melt is discharged as extrudate from a die plate and is immediately wetted and rapidly cooled by much water or cooling agent and is then introduced, via a sloping plane, into a waterbath or cooling-liquid bath, and is granulated after cooling.

In a very particularly preferred embodiment, an extruder is used as mixing apparatus for components A) to G), with the underwater granulation just described. The discharge orifice of the extruder in this embodiment. is therefore a die plate located underwater (or sprayed with water) and having cutting apparatuses, in particular rotating knives.

One preferred preparation process therefore comprises 1) preparing the graft copolymer A) by emulsion polymerization,
2) mixing the graft copolymer A) with the hard copolymer B) and with the other components C) if present, D), E), F) and G) if present, in a mixing apparatus, producing a substantially molten polymer mixture, and
3) rapidly cooling the substantially molten polymer mixture within 10 sec.

Particular preference is. given to thermoplastic molding compositions comprising the components A), B), D), E), F), and, where appropriate, C) and G) described above, and butadiene as conjugated diene all), obtainable by 1) preparing the graft polymers A) by emulsion polymerization, giving a moist polymer A) which comprises up to 60% by weight, based on A), of residual water,
2) mixing the moist graft polymer A) with the other components B) to G) in an extruder, producing a substantially molten polymer mixture, where at least 30% by weight of the residual water from the moist graft polymer A) is removed under pressure in the form of liquid water as a result of pressure build-up in the extruder, and
3) rapidly cooling the substantially molten polymer mixture, within a period of 10 sec, by underwater granulation.

In another particularly preferred embodiment, the additives C) to G) are added at various junctures within the preparation process. For example, one or more of components C) to G) may be added while the graft copolymer A) is still in the form of the aqueous dispersion/emulsion (prior to, during or after the polymerization reaction of A)), and the other components are added at a later juncture, for example during the mixing in the extruder or other mixing apparatuses.

In another particularly preferred embodiment, one or more, or all, of the additives C) to G) are divided into two or more portions and these portions are added at various junctures within the preparation process. For example, one portion of components D) and E) can be added while the graft copolymer A) is still in the form of the aqueous dispersion/emulsion (prior to, during or preferably after the polymerization reaction of A)), and the addition of the remaining portion may be delayed until during the mixing of components A) to G) in the extruder or other mixing apparatuses.

It is very particularly preferable to add a portion of component D) and a portion of component E) to the dispersion/emulsion of the graft copolymer A) and to add the remaining portion of D) and E) during the mixing of components A) to G) in the extruder.

It is preferable for at least that portion of D) and E) which is added to the graft copolymer dispersion to be in the form of an aqueous dispersion, that is to say that a dispersion of D) and E) (in the form of a mixture or of two separate dispersions) is added to the dispersion of A).

The proportion of component D) which is added while the graft copolymer A) is still in the form of the aqueous dispersion/emulsion is preferably from 20 to 100% by weight, based on the total amount of D). The corresponding proportion of component E) is preferably from 30 to 100% by weight, based on the total amount of E).

Another preferred preparation process therefore comprises 1) preparing the graft copolymer A) by emulsion polymerization,
2) adding some or all of component D) and some or all of component E) to the aqueous dispersion or emulsion prior to, during or after the polymerization reaction of A),
3) adding any remaining amount of components D) and E) into a mixing apparatus in which components A), B), C) if present, E), F) and G) if present, are mixed, producing a substantially molten polymer mixture, and
4) rapidly cooling the substantially molten polymer mixture within 10 sec.

Properties of the Molding Compositions:

The molding compositions of the invention have very good resistance to weathering, together with a balanced profile of mechanical properties, in particular high toughness, even after weathering and, respectively, heat-aging. The good weathering resistance and, respectively, heat-aging resistance is therefore not achieved at the expense of the mechanical properties. The molding compositions of the invention show little change in shade after weathering and, respectively, heat-aging, and develop only slight dust-patterning in dusty environments. They have improved colorant dispersion, and also improved demolding when injection-molded.

The molding compositions can be used to produce moldings, fibers or films of any type. The thermoplastic molding compositions of the invention can be processed by the known methods of thermoplastic processing, e.g. by extrusion, injection molding, calendering, blow molding, compression molding, or sintering.

The median particle size d given is the ponderal median particle size as determined using an analytical ultracentrifuge and the method of W. Scholtan and H. Lange, Kolloid- Z. und Z.-Polymere 250 (1972) pp 782 to 796. The ultracentrifuge measurement gives the cumulative weight distribution of particle diameter in a specimen. From this it is possible to find the percentage by weight of particles whose diameter is the same as or smaller than a particular size.

The $d_{10}$ value gives that particle diameter at which the diameter of 10% by weight of all of the particles is smaller and that of 90% by weight is larger. Conversely, the $d_{90}$ value is that at which the diameter of 90% by weight of all of the particles is smaller and that of 10% by weight is larger than that diameter which corresponds to the $d_{90}$ value. The ponderal median diameter $d_{50}$ and the volume-median particle diameter $D_{50}$ are those diameters at which the diameter of 50% by weight and, respectively, 50% by volume of all of the particles is larger and that of 50% by weight and, respectively, 50% by volume is smaller. The $d_{10}$, $d_{50}$ and $d_{90}$ values characterize the breadth Q of the particle size distribution, where $Q=(d_{90}-d_{10})/d_{50}$. As Q reduces, the distribution becomes narrower.

EXAMPLES

Constituents of the Molding Compositions

Graft Polymer A

A1: A graft rubber was prepared and agglomerated using emulsion polymerization, as described in DE-AS 24 27 960, column 6, line 15 to column 7, line 25. The graft rubber was composed of 60 parts by weight of polybutadiene graft base and of 40 parts by weight of styrene-acrylonitrile copolymer graft, and had a median particle size $d_{50}$ of 176 nm. The graft contained 30% by weight of acrylonitrile.

A2: Graft rubber is described for A1, but median particle size $d_{50}$ 146 nm and acrylonitrile content of the graft 20% by weight.

Where appropriate, additives C) to G), in the form of their aqueous dispersions, were added to the resultant graft rubber dispersion (see Table 2).

The graft rubber dispersion was coagulated using $MgSO_4$ solution (unlike in DE-AS 24 27 960). The coagulated rubber was removed from the water of the dispersion by centrifuging, and washed with water. This gave a rubber with about 30% by weight of adhering or enclosed residual water.

Hard copolymer B:

The polymers B were prepared by continuous solution polymerization as described in Kunststoff-Handbuch, Ed. R. Vieweg and G. Daumiller, Vol. V "Polystyrol", Carl-Hanser-Verlag, Munich, 1969, pp 122–124. Table 1 summarizes the compositions and properties.

TABLE 1

| Component | B1 | B2 | B3 | B4 |
|---|---|---|---|---|
| Styrene [% by weight] | 65 | 76 | 65 | 75 |
| Acrylonitrile [% by weight] | 35 | 24 | 35 | 25 |
| Viscosity number VN[1)] [ml/g] | 60 | 64 | 80 | 81 |

[1)]determined to DIN 53726 using a 0.5% strength by weight solution in dimethylformamide at 25° C.

Three-block copolymer C:

Pluronic® ethylene oxide-propylene oxide-ethylene oxide three-block copolymer from BASF was used. The average molar mass $\overline{M}_n$ (number average, determined from the OH value to DIN 53240) of the central PO block was 2300 g/mol, and the proportion of terminal EO blocks in the copolymer taken together was 10% by weight, based on the copolymer. The portion of PO was therefore 90% by weight, based on the copolymer.

Component D

Wingstay®L from Goodyear was used, a butylated reaction product of p-cresol with dicyclopentadiene having the formula II as given in the description.

Component E

Irganox®PS 800 from Ciba was used, dilauryl thiodipropionate.

Component F

A commercially available quality of magnesium stearate was used.

Component G

G1: Topanol® CA from ICI, 1,1,3-tris(2'-methyl-4'-hydroxy-5'-tert-butylphenyl)butane G2: Irgafos® 168 from Ciba, tris-(2,4-bis(1,1-dimethylethyl)phenyl) phosphite G3: Lowinox® 44S36 from Lowi, a sulfur-containing phenolic stabilizer, 4,4'-thiobis(2-tert-butyl-5-methylphenol)

Preparation of the blends

After isolation by centrifuging, the graft rubber A comprising residual water was very substantially freed from residual water. To this end, the rubber was dewatered in a Werner and Pfleiderer ZSK 30 extruder at 250 rpm and 5 kg/h throughput at 50° C. The dewatering took place via restricted-flow pressure zones of the extruder screws and via associated water-removal apertures through which the residual water removed under pressure was discharged from the extruder.

The resultant very substantially dewatered rubber was intimately mixed with the other components B) to G), with evaporation of the residual water, in a Werner and Pfleiderer ZSK 30 extruder at 250 rpm and 10 kg/h throughput at 250° C. The molding composition was extruded, and the polymer melt was subjected to rapid cooling by being passed into a water bath whose temperature was about 40° C. The hardened molding composition was pelletized.

Production and Testing of Moldings

The pellets obtained were injection molded at 240° C. melt temperature and 60° C. mold temperature to give test specimens.

For the weathering tests, plaques of dimensions 60×60×2 mm were produced. The specimens were exposed to light and weathering for 100 hours to ISO 4892/2, Method A, black-panel temperature 65° C. Color measurement using the CIE Lab method was then undertaken as described in DIN 6174 in combination with DIN 5033, Parts 1–9.

The db values and dG values given in Table 2 were calculated as follows:

For the db* value, the b* value was determined prior to exposure to light and weathering and again thereafter. The relationship is: db*=b* after weathering–b* prior to weathering.

For the dG value, the Yellowness Index G was calculated from $$G = \frac{1.301 \cdot X - 1.149 \cdot Z}{Y} \cdot 100$$

where X, Y, and Z are standard color values to DIN 5033. Measurements were taken at an observation angle of 10° in D65 daylight and evaluated to DIN 6167. The G value was determined prior to exposure to light and weathering and again thereafter. The relationship is: dG=G after weathering–G prior to weathering.

For the heat-aging, test specimens (tensile specimens) were produced to ISO 11403-3 (Part 3), FIG. 1 on page 5

("Details of the ISO 294-2 small tensile specimen") with the dimensions given in that specification. Heat-aging took place at 90° C. The test specimens were tested to ISO 11403-3, the fracture energy being measured in the tensile test. The table below gives the change in fracture energy after 12 weeks (2016 hours) of storage at 90° C. in percent, based on the initial value A, which was set at 100%. In order to exclude the effect of any orientation or relaxation phenomena in the test specimen the initial value A was taken as the arithmetic average of measurements after 48, 168 and 336 hours of heat-aging (2 days, 1 week and 2 weeks).

Table 2 gives the results.

weathering resistance. Component D) is absent in Examples C1 to C4, component E) is absent in Example C5 and D) and E) are absent in Example C6, as a result of which very high values of db* and dG are obtained in all cases: db*>+7, dG>15.

The table also shows that molding compositions in which, not according to the invention, one or more of the three additives D), E), and F) have been replaced by other additives (G1, G4) display significantly worse weathering resistances than the molding compositions of the invention.

Finally, it can be seen that only the molding compositions of the invention still have good fracture energies after

TABLE 2

Composition of the molding compositions (in parts by weight) and properties (C = for comparison, nd = not determined)

| Example | 1 | 2 | 3 | 4 | 5 | 6 | 7 |
|---|---|---|---|---|---|---|---|
| Graft copolymer A | 43<br>A1 | 43<br>A1 | 29<br>A2 | 29<br>A2 | 29<br>A2 | 29<br>A2 | 29<br>A2 |
| Copolymer B | 57<br>B1 | 57<br>B1 | 71<br>B2 | 71<br>B2 | 71<br>B2 | 71<br>B2 | 71<br>B2 |
| Three-block copolymer C [2] | — | — | — | — | — | 0.5 | — |
| Wingstay ® L D [1] | 0.4/<br>— | 0.2/<br>— | 0.2/<br>0.1 | 0.2/<br>0.15 | 0.2/<br>0.1 | 0.2/<br>0.15 | 0.6/<br>— |
| Dilauryl thiodipropionate E [1] | 0,8/<br>— | 0.4/<br>— | 0.4/<br>0.2 | 0.4/<br>0.15 | 0.4/<br>0.2 | 0.4/<br>0,15 | 1.2/<br>— |
| Magnesium stearate F [2] | 0.25 | 0.25 | 0.25 | 0.25 | 0.25 | 0.25 | 0.25 |
| Other additives G [2] | — | — | — | — | 0,1<br>G2 | — | — |
| db* [3] | +0.2 | −0.2 | +2.3 | +2.4 | +1.8 | +1.1 | +2.0 |
| dG [3] | +0.6 | −0.6 | +4.7 | +4.9 | +3.7 | +2.2 | +4.0 |
| Change in the fracture energy [4] [% of the initial value A] | nd | nd | nd | 72 | 60 | 55 | 76 |

| Example | 8 | C1 | C2 | C3 | C4 | C5 | C6 |
|---|---|---|---|---|---|---|---|
| Graft copolymer A | 29<br>A2 | 30<br>A1 | 43<br>A1 | 29<br>A2 | 40<br>A2 | 29<br>A2 | 44<br>A1 |
| Copolymer B | 71<br>B2 | 70<br>B1 | 57<br>B3 | 71<br>B2 | 60<br>B4 | 71<br>B2 | 56<br>B1 |
| Three-block copolymer C [2] | — | — | — | — | — | — | — |
| Wingstay ® L D [1] | 0.2/<br>— | —/<br>— | —/<br>— | —/<br>— | —/<br>— | —/<br>0.25 | —/<br>— |
| Dilauryl thiodipropionate E [1] | 0.4/<br>0.2 | —/<br>0.2 | —/<br>0.2 | —/<br>0.2 | —/<br>0.2 | —/<br>— | —/<br>— |
| Magnesium stearate F [2] | 0.25 | 0.25 | 0.25 | 0.25 | 0.25 | 0.25 | 0.25 |
| Other Additives G [2] | 0.1<br>G1 | 0.2<br>G3 +<br>0.1<br>G1 | 0.2<br>G3 +<br>0.1<br>G1 | 0.2<br>G3 +<br>0.1<br>G1 | 0.2<br>G3 +<br>0.1<br>G1 | 0.2<br>G3 | 0.2<br>G3 |
| db* [3] | +1.8 | +8.1 | +7.3 | +11.9 | +13.2 | +10.2 | +14.3 |
| dG [3] | +3.9 | +17.0 | +15.1 | +27.6 | +28,7 | +23.1 | +29.0 |
| Change in the fracture energy [4] [% of initial value A] | 54 | 8 | 10 | 15 | 8 | 53 | nd |

[1] number before the oblique stroke: amount in the form of a dispersion of E added to the dispersion of the graft rubber A, based on the solids content of the graft rubber dispersion Number after the oblique stroke: amount added in the preparation of the molding composition
[2] Addition during the preparation of the molding compositions
[3] Result of the color measurement after illumination and weathering for 100 h
[4] After heat-aging at 90° C. for 12 weeks The table shows that only those molding compositions which, according to the invention, comprise all three additives D), E), and F) have a high weathering resistance (db*<+5.0, dG<+10.0). A particularly high weathering resistance is displayed by molding compositions which (at a given rubber content of the molding composition of 29 parts by weight) further comprise the component c) (Example 7 with db*<+1.5 and dG<+2.5).

In contrast, molding compositions which, not according to the invention, do not contain one or more of the three additives D), E), and F) display a considerably worse heat-aging for 12 weeks. In the case of the molding compositions which are not according to the invention, the fracture energy drops sharply to as low as 8% of the initial value, while it remains at 54% or more of the initial value in the case of the molding compositions of the invention. The thermal aging resistance of the molding compositions of the invention is accordingly improved significantly.

We claim:

1. A method of improving the weathering resistance and heat-aging resistance of a thermoplastic molding composition, the composition comprising, A) from 5 to 70% by weight of at least one graft copolymer A) made from, based on A),
   a1) from 10 to 90% by weight of at least one elastomeric graft base with a glass transition temperature below 0° C., and
   b2) from 10 to 90% by weight of at least one graft made from, based on a2),
      a21) from 50 to 100% by weight of at least one styrene compound,
      a22) from 0 to 50% by weight of acrylonitrile or methacrylonitrile, or a mixture of these, and
      a23) from 0 to 50% by weight of at least one other monoethylenically unsaturated monomer,
by incorporating into said thermoplastic molding composition,
   B) from 29 to 90% by weight of a hard copolymer made from, based on B),
      b1) from 50 to 100% by weight of at least one styrene compound,
      b2) from 0 to 50% by weight of acrylonitrile or methacrylonitrile, or a mixture of these, and
      b3) from 0 to 50% by weight of at least one other monoethylenically unsaturated monomer,
   C) from 0.01 to 5% by weight of at least one three-block copolymer X-Y-X having a central block Y made from propylene oxide units and having terminal blocks X made from ethylene oxide units,
   D) from 0.01 to 5% by weight of at least one butylated reaction product of p-cresol with dicyclopentadiene of the formula (I)

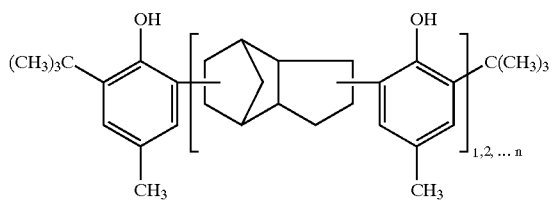

(I)

where $n \leq 10$,
   E) from 0.01 to 5% by weight of at least one thiocarboxylic ester,
   F) from 0.01 to 5% by weight of at least one alkali metal salt or alkaline earth metal salt of a $C_6$–$C_{20}$ carboxylic acid, and
   G) from 0 to 30% by weight, based on components A) to G), of other conventional additives,
where the weathered db*value of the molding compositions is below +5.0 after 100 hours of exposure to light and weathering to ISO 4892/2, method A, black-panel temperature 65° C., using the CIE-Lab color system, to DIN 6174 and DIN 5033, and where all percentages are based on components A) to F).

2. The method as claimed in claim 1, where the molding composition has a dG value below +10.0 after 100 hours of exposure to light and weathering to ISO 4892/2, method A, black-panel temperature 65° C. the color measurement to DIN 5033 at an observation angle of 10° in D65 daylight with evaluation to DIN 6167.

3. The method as claimed in claim 1, in which the graft base a1) is a polymer made from, based on a1),
   a11) from 60 to 100% by weight of at least one conjugated diene or $C_1$–$C_{10}$ alkyl acrylate, or a mixture of these,
   a12) from 0 to 30% by weight of at least one other monoethylenically unsaturated monomer, and
   a13) from 0 to 10% by weight of at least one crosslinking monomer.

4. The method as claimed in claim 3, in which component a11) is butadiene and component B) is a styrene-acrylonitrile copolymer having from 10 to 50% by weight of acrylonitrile.

5. The method as claimed in claim 3, in which component a11) is butadiene and component B) is a styrene-acrylonitrile copolymer having from 22 to 33% by weight of acrylonitrile.

6. The method as claimed in claim 1, in which the propylene oxide central block Y of component C) has an average molecular weight $M_n$ (number-average) of from 2000 to 4000.

7. The method as claimed in claim 1, in which component E) is dilauryl thiodipropionate or distearyl thiodipropionate, or a mixture of these.

8. The method as claimed in claim 1, in which component F) is potassium stearate or magnesium stearate, or a mixture of these.

9. A process for preparing the thermoplastic molding composition as described in claim 1, which comprises
   1) preparing the graft copolymer A) by emulsion polymerization,
   2) mixing the graft copolymer A) with the hard copolymer B) and the other components C) if present, D), E), F) and G) if present, in a mixing apparatus, producing a substantially molten polymer mixture, and
   3) rapidly cooling the substantially molten polymer mixture within 10 sec.

10. A process for preparing the thermoplastic molding composition as described in claim 1, which comprises
   1) preparing the graft copolymer A) by emulsion polymerization,
   2) adding some or all of component D) and some or all of component E) to the aqueous dispersion or emulsion prior to, during or after the polymerization reaction of A),
   3) adding any remaining amount of components D) and E) into a mixing apparatus in which components A), B), C) if present, E), F), and G) if present, are mixed, producing a substantially molten polymer mixture, and
   4) rapidly cooling the substantially molten polymer mixture within 10 sec.

* * * * *